United States Patent Office 2,823,789
Patented Feb. 18, 1958

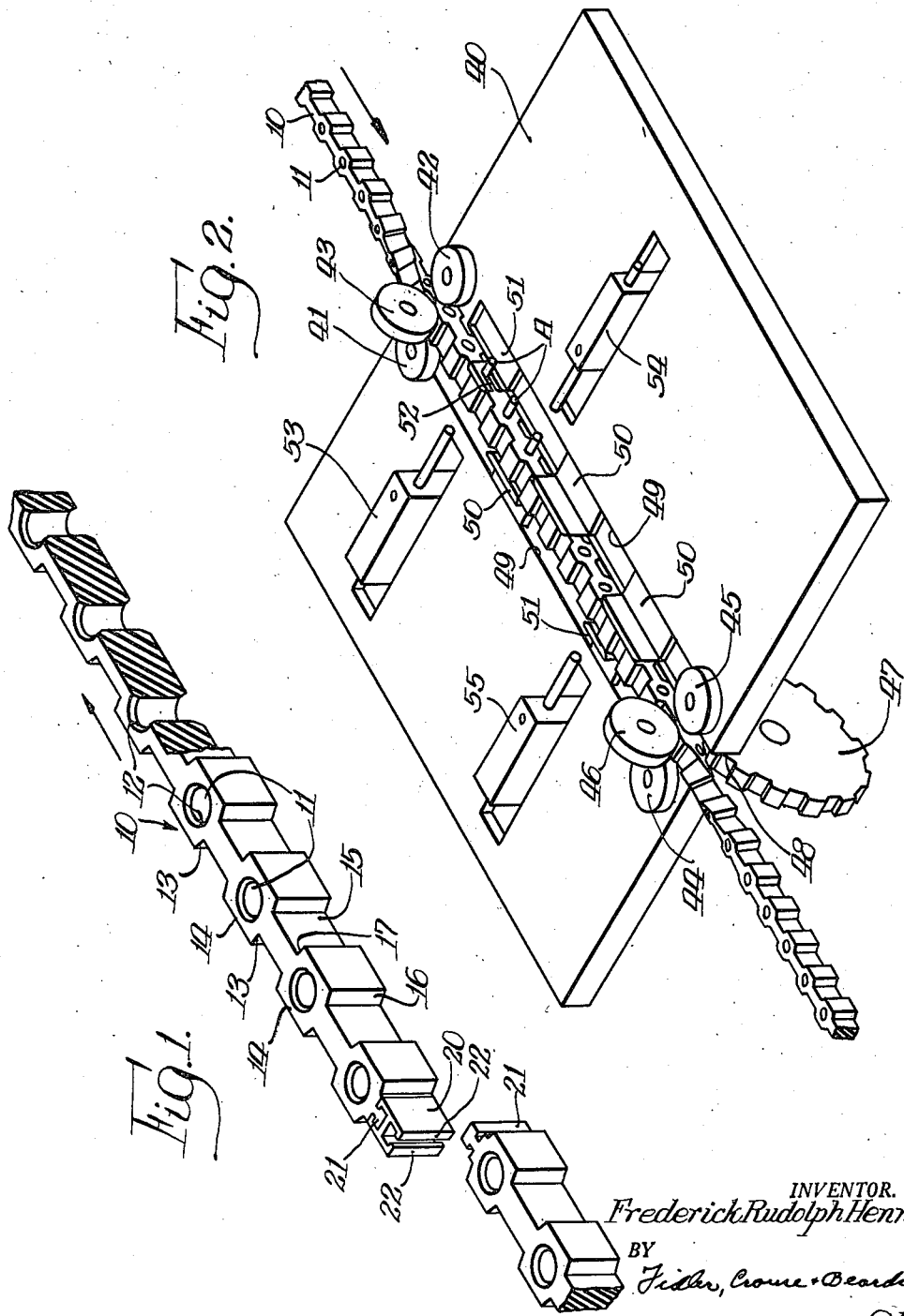

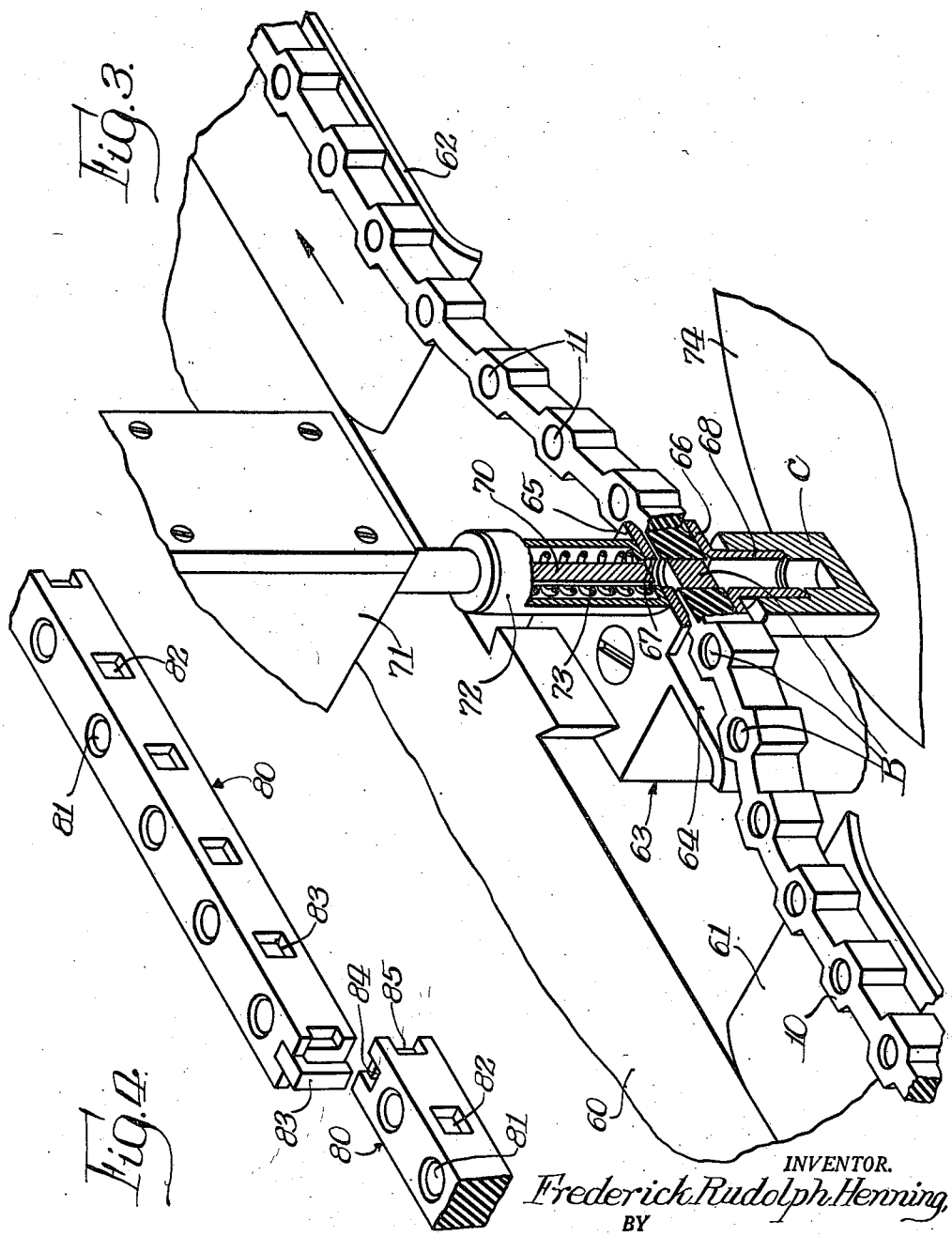

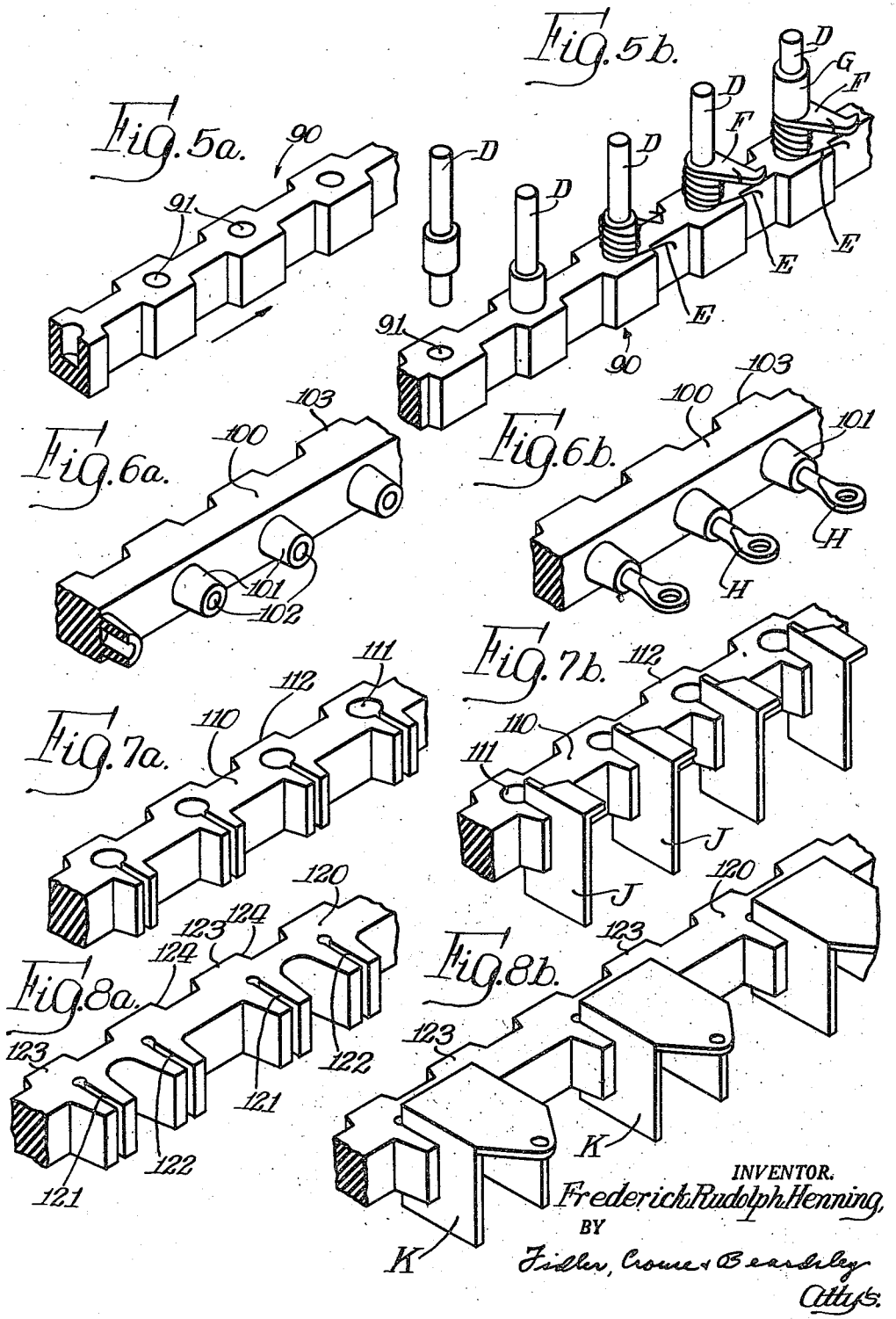

2,823,789

PARTS FEEDER RIBBON

Frederick Rudolph Henning, Janesville, Wis., assignor to Gilman Engineering & Manufacturing Corporation, Janesville, Wis., a corporation of Wisconsin Application May 6, 1952, Serial No. 286,290

13 Claims. (Cl. 198—131)

This invention relates to feeder belts and has to do particularly with a feeder belt adapted to be driven positively in a timed manner and carry at predetermined, fixed locations spaced along the belt the articles to be fed.

In many manufacturing operations it is necessary or desirable to feed in a timed sequence a series of articles to a predetermined point or device at which work is to be performed on such articles or they are to be assembled with other articles. Various devices have been developed for feeding articles mechanically, and where the articles are all the same size and where they are relatively small, such feeding devices have often taken the form of hoppers or the like in which the articles are placed in bulk and from which they are withdrawn successively.

In many instances the articles or parts to be fed are of such nature that it is not satisfactory to place them in bulk in a hopper. For example, the articles may be such that they may be damaged by striking against the hopper or the other articles or parts therein. Moreover, in certain instances the articles may be sensitive to shock and the use of a hopper is not practicable.

An object of the present invention is to provide an improved feeder belt for feeding articles or parts successfully to a predetermined point or device.

Another object of the invention is to provide a feeder belt for feeding articles, which belt is so formed that the articles are protected against abrasion and shock and other damage.

Still another object is the provision of a feeder belt for carrying a series of objects or parts so formed that the articles may be readily inserted therein either manually or mechanically and are securely held therein for transportation or feeding and may be removed readily either manually or mechanically without injury to the article or belt.

A further object of the invention is to provide a feeder belt for feeding a series of objects in an accurately spaced series in which the belt is adapted to be positively driven, whereby the articles may be delivered to a predetermined point in closely controlled spaced and timed relation.

Another object of the invention is to provide a feeder belt which is capable of use with any one of a number of different types of devices for driving the belt with a high degree of accuracy and for inserting objects therein and removing them therefrom.

Still a further object of the invention is to provide a package consisting of a plurality of articles and a container therefor of such nature that the package may be readily shipped, stored and handled and may be employed without removing the articles therefrom for feeding the articles to a predetermined point or device for performing work on the articles after removal from the container or assembling the articles with other articles.

Other objects and advantages would appear from the following description taken from the appended drawings, in which:

Figure 1 is a perspective view partially in cross section of portions of two belt sections formed in accordance with the present invention;

Fig. 2 is a fragmentary perspective view showing a portion of one form of apparatus with which the belt of the present invention is adapted to be used;

Fig. 3 is a fragmentary perspective view of another form of apparatus with which the belt of the present invention is adapted to be used;

Fig. 4 is a fragmentary perspective view of portions of two belt sections of modified form adapted to be driven by a pin-type driving wheel;

Fig. 5a is a fragmentary perspective view of a belt section of modified form having blind cavities for receiving the articles;

Fig. 5b is a view similar to Fig. 5a only showing the belt section with the articles carried thereby;

Fig. 6a is a fragmentary perspective view of a belt section of modified form having side type cavities;

Fig. 6b is a view similar to Fig. 6a only showing the belt section with the articles carried thereby;

Fig. 7a is a fragmentary perspective view of a belt section of modified form provided with snap-in type cavities;

Fig. 7b is a view similar to Fig. 7a only showing the belt section with the articles carried thereby;

Fig. 8a is a fragmentary perspective view of a belt section of modified form having group type cavities; and Fig. 8b is a view similar to Fig. 8a only showing the belt section with the articles carried thereby.

The belt of the present invention may be formed as a single member suitably joined at the ends by means hereinafter described, or it may be initially formed as a single endless member. Alternatively, and in many instances preferably, the belt is formed in a plurality of sections which are joined together by suitable connecting means hereinafter described, whereby such sections may be connected to provide a belt of the desired length. Also, as will hereinafter appear where the belt is formed in sections, the several sections usually may be employed more readily as containers for shipping, storing and handling the articles carried therein.

The belt of the present invention lends itself to manufacture in various sizes. When made in smaller sizes it is sometimes referred to as a "ribbon" although the term is not intended to be limiting.

The belt is formed of a material which is sufficiently rigid to maintain its shape but is sufficiently flexible in all directions so that the belt may be caused to assume sufficiently bent or twisted forms to allow it to follow such driving, guiding and other devices as may be employed to convey, feed and operate upon the articles carried by the belt. The belt is also preferably sufficiently soft to provide a cushioning effect to protect the articles carried therein against shock and other injury and to permit a press fit of each article or a portion thereof in the belt without injury to the article. The material has sufficient rigidity not only to maintain its form and protect the articles carried thereby but also to permit it to be driven by positive driving means such as a sprocket or gear. The material of the belt is sufficiently rigid so as to maintain a predetermined space relation between the surfaces of the belt which are engaged by the belt-driving elements and the article-carrying portions of the belt, whereby the feed of the articles can be accurately timed. I have found that excellent results may be obtained where the belt is formed of natural rubber, or synthetic rubber, or other elastomers having sufficient flexibility and elasticity to permit its use in the manner herein described and at the same time of sufficient stability or aging characteristics to permit it to be handled or stored for a reasonable length of time without taking a substantial set.

The belt or belt section is provided with a longitudinally extending series of spaced cavities adapted to receive articles to be carried by the belt. The cavities may take various forms adapted to receive the articles to be carried, or portions of the articles for supporting the articles in the belt at predetermined, fixed locations therealong. For example, the cavities may extend entirely through the belt from side to side, or they may be "blind" cavities in the nature of sockets, or cavities in the form of channels or the like which are open along the side as well as at one or both ends, or the cavities may be formed in projections extending from the main body of the belt. The types and forms of the cavities will in general depend upon the shape of the articles to be carried. Usually the cavities will be disposed at equally spaced intervals along the belt but in some instances, as will be pointed out hereinafter, the cavities are not equally spaced. Generally the cavities will be formed in recurring series in order to provide uniformity of feed of the articles carried to the belt.

The cavities are formed with a dimension of sufficient size to admit the articles to be fed by the belt but preferably a few thousandths less than the corresponding dimensions of the articles, so that when the articles are inserted in the belt the latter is expanded slightly and the elasticity of the belt causes the articles to be gripped firmly in their respective cavities.

In order to provide for conveniently driving the belt at a predetermined, preferably uniform rate, drive faces extending in a generally transverse direction relative to the length of the belt are provided. Preferably in order to conveniently drive the belt by a sprocket or generally equivalent driving means, the drive faces are equally spaced along the belt. The drive faces are located at predetermined fixed distances from the centers of the corresponding cavities in order to be assured accurate, predetermined distances of the cavities as the belt is fed. Thus, even though in certain cases it may be found desirable to space the cavities at unequal distances, nevertheless the distance between the center of any cavity and the corresponding drive face is maintained and the desired timed movement of the cavities can be readily assured. For example, it may be found desirable to arrange the cavities in a plurality of recurring series, in which arrangement while the series are equally spaced and corresponding spacings are provided in each series, nevertheless the spacing between all cavities in the belt is not uniform. In such an arrangement, the drive faces are so arranged that they are similarly spaced with respect to each of the series.

Preferably the driving means includes a sprocket or a pin type wheel adapted to engage the belt and since such driving elements customarily have uniformly spaced teeth or pins, it will ordinarily be found desirable to space the drive faces equally along the belt. Where a sprocket type driving element is employed the drive faces conveniently are formed by notching the side faces of the belt to provide a series of spaced lugs adapted for engagement by the teeth of the sprocket. Depending upon the nature of the drive, such lugs may be formed along one face of the belt or along opposite faces.

In order to insure the desired degree of control over the movement of the belt, stop faces are provided along the driving face or faces of the belt in generally opposite relation to the driving faces. Thus, control over the movement of the belt can be assured in both directions along the line of movement of the belt and the belt thus accurately moved and accurately halted. It will be seen that where lugs are employed, for example, to provide the driving faces of the belt, the face at one end of each of the lugs may constitute the driving face and the face at the other end of the lug may then provide the stop face.

The spacing between adjacent cavities is determined by several factors such as the type of operation to which the belt is to be applied, the type of driving mechanism, the type and size of the articles and the timing of the delivery of articles. The spacing between adjacent cavities should be sufficient to permit the desired flexibility both in respect to the bending of the belt and twisting of the belt in order to permit the belt to accommodate itself to any guiding and driving means to which it is to be employed.

The articles to be fed may be inserted in the belt manually or they may be inserted by suitable mechanical inserting means (not shown) and they may be removed in either such manner although ordinarily the articles will be removed by mechanical means. The belt adapts itself for feeding articles to a point at which work is to be done on the articles without completely removing them from the belt, and the articles may be partially projected from the belt for the purpose of performing work on the articles, and then returned to their normal position in the belt for transportation away from the point of work.

The belt of the present invention provides convenient means for feeding the articles to a predetermined point sometimes called the "work point," at which work is to be performed on the articles such, for example, as painting, gauging, assembly with other articles or parts, or other operations. Operation may be performed at the work point with the article remaining in position in the belt, or moved to a projected position relative to the belt but nevertheless remaining at least partially in the belt, or the article may be entirely ejected from the belt at the work point and replaced at the same point or it may be ejected at the work point and not returned to the belt.

The belt or belt section of the present invention not only may be utilized as means for transporting the articles and feeding the articles to a desired point, but also may serve as a protective container for the articles, whereby they may be shipped and stored in the belt. For example, in certain instances it may be desired to insert the articles in the belt at the point of manufacture and ship the package consisting of the belt and articles to another point for performing work on the articles or assembling them with other articles. In such case, the belt with other articles therein may be inserted in a suitable shipping container such as a box and in many cases no separating or packing material is necessary inasmuch as the belt or section itself serves adequately to protect articles against damage or shock. Where the belt or section is to be employed as container for shipping or storing the articles, it ordinarily will be found preferable to employ sections instead of a complete belt—except where the belt is very short—the sections being of relatively short length so that they can be conveniently handled and packaged for shipping and storage. However, owing to the relatively flexible nature of the belt it may not always be found necessary to sectionalize the belt as it can be folded or rolled into comparatively compact form, and especially where the lugs and web portions are of equal length and can be interfitted.

One embodiment of the invention is illustrated in Fig. 1 of the drawings to which reference now is made. The belt or belt section is formed by a member 10 having a generally rectangular cross section. Preferably the top and bottom faces or edges of the member are flat and parallel, which facilitates guiding the belt and supporting it for insertion and removal of the articles.

The belt member 10 is provided with a longitudinally extending series of equally spaced cavities 11 extending widthwise entirely therethrough. The belt member 10 is adapted to feed cylindrical articles and accordingly, the cavities 11 take the form of cylindrical bores. For facilitating insertion and removal of the articles, the bores are beveled or counter-sunk at their two ends as indicated at 12 in Fig. 1 of the drawings, although this is not necessary in many instances.

The series of cavities or bores 11 is disposed centrally of the belt member 10 with their center lines lying in the longitudinal median plane of the belt. This symmetrical arrangement of the cavities offers several advantages, which will appear from the following description.

The belt member 10, illustrated in Fig. 1, is provided with a longitudinally extending series of spaced indentations or notches 13 extending inwardly from each face and across the width of the belt member, alternating with the portions of the belt member in which the cavities are formed, thereby providing a series of lugs or teeth 14 adapted for engagement by a suitable driving means such as sprocket or gear wheel for positively driving the belt. The indentations 13 are of sufficient depth to provide lugs 14 of sufficient height to provide substantial engagement between the side of the lug and driving element such as the sprocket or gear tooth, but the web portions 15 intermediate the cavity-containing portions are of sufficient thickness to provide the desired strength and resistance to excessive elongation of the belt member.

The arrangement of notches and lugs in the belt 10 provides two drive faces at one end of each lug and two stop faces at the other end. For example, assuming the belt 10 as shown in Fig. 1 to be driven in the direction of the arrow, the beveled face 16 would serve as a drive face and the beveled face 17, as a stop face. Of course, if the direction of drive were reversed, then the face 17 would serve as the drive face and the face 16, as the stop face. Where the drive engages the belt at both sides, then both beveled faces at one end of each lug are employed as drive faces and both faces at the other end of the lug are stop faces.

The cavity-containing portions of the belt 10 are of sufficient thickness taking into consideration the diameter of the cavities to provide an adequate wall thickness of material between the wall of the cavity and the side faces of the belt, to provide the desired protection for the article in the cavity.

The lugs 14 are of sufficient rigidity so that they may serve for positive drive of the belt by the driving means, both when the articles to be fed are in place in the cavities and when no articles are in the cavities. To this end, the wall thickness of the material between the cavities and the side face of the lug is of sufficient thickness and the material from which the belt is formed is of sufficient rigidity to insure that the lug has the necessary rigidity to permit it to be driven even when there is no article in the corresponding cavity.

In the form of the invention shown in Fig. 1 the belt member is made sufficiently wide so that its widthwise dimension is slightly greater than the corresponding dimensions of the article to be fed by the belt and thus the article inserted in a cavity may be located entirely within the confines of the belt so that it is protected against damage and shock in all directions.

As previously explained, the belt may be formed either as a continuous, endless belt or may be so formed that its ends may be connected together by suitable connecting means to form an endless member. In the latter case suitable splicing or connecting clip 20 formed from a suitable material, preferably metal such as brass, is employed for joining the ends of the belt. For the purpose of connecting the ends of the belt, the latter is provided at each end with a connecting or splicing portion 21 of generally T-shape formation adapted to receive the splicing clip 20 which preferably is of generally H-shape cross section, with the end edges 22 of the flanges inturned to grip and hold the splicing portion 21 within the corresponding portion of the splicing clip 20. The splicing portions of the belt and clip are so dimensioned that the spacing between the two endmost cavities and the corresponding lugs is the same as the spacing between the remaining cavities of the belt.

As hereinbefore stated, the belt may be made in a plurality of sections which are connected together in the desired number to form the desired length of belt. Where the belt takes this form, the sections are spliced together by a splicing connection which may be identical with the connection just described in relation to connecting the ends of the belt together.

It will be apparent from the foregoing that the belt of the present invention lends itself to application in a wide variety of operations and it may be employed in connection with many different types of driving and guiding devices. In order to illustrate a few such advantages of the belt there is shown somewhat diagrammatically in Fig. 2, a portion of one form of device for driving and guiding the belt, and for projecting articles from the belt, at least partially, for the purpose of performing work on the articles.

The apparatus includes a base 40 having three rollers 41, 42 and 43 supported by suitable means (not shown), with the rollers 41 and 42 adapted to engage opposed faces of the belt and the roller 43 adapted to engage the intermediate face, the fourth face being supported as hereinafter explained. A similar arrangement of rollers 44, 45 and 46 is provided at another portion of the base 40. The rollers 41, 42, 43 are so arranged as to twist the belt to 90° about its axis of forward movement as the belt projects the mechanism, and the rollers 44, 45, 46 of the second set are arranged to permit the return of the belt to its original orientation.

The belt is driven past the mechanism in suitable manner as by a driving sprocket 47 suitably supported for rotation and for engagement with the under surface of the belt through an opening 48 in the base 40, at a point adjacent the rolls 44, 45 and 46. If desired, a similar sprocket (not shown) may be provided adjacent the other edge of the base 40.

The belt is supported on the base and is guided therealong by a plurality of spaced guides adapted to engage the side edges of the belt, which guides are adjustably supported in guide grooves 49. Guides 50 arranged along the two sides of the path traveled by the belt serve primarily to guide the belt, but also support the belt against lateral movement when articles are projected therefrom or returned to their original positions in the belt as hereinafter described. The guides 51 are provided with notched openings 52 to permit articles to be projected from the belt at the points at which the guides are located, and serve primarily as backing members for resisting the thrust of the article projecting means.

For the purpose of projecting articles from the belt so that work can be performed on the articles, a punch 53 is suitably mounted relative to the base 40 for reciprocable movement in a direction normal to the direction of travel of the belt. A generally similar punch 54 is provided on the opposite side of the belt and at a point farther along the path of the belt for returning the articles to their original positions within the belt. Other punches, such as punch 55, may be provided as required.

In utilizing the mechanism illustrated in Fig. 2, the belt 10 is driven in a suitable manner as by the sprocket 47, the belt being guided through the two sets of rollers and guides in the direction indicated by the arrow. The belt is driven in a timed step-by-step movement to bring the cavities of the belt successively into position opposite the punch 53 by suitable mechanism (not shown). The punch 53 is advanced as each of the cavities is halted in line with the punch and projects the article A partially from the belt as illustrated, to make the projected portion of the article accessible for performing the work. During the forward step-by-step movement of the belt each cavity is brought to a position opposite the punch 54, which latter punch is appropriately reciprocated to return the article A to its initial position within the belt.

Another mechanism illustrating the adaptability of the belt of the present invention is shown in Fig. 3 to which reference now is made. This mechanism includes a suitable support 60 carrying fixed guides 61 and 62 and a vertically movable guide assembly 63. The guide assembly 63 includes a vertically extending lead in guide 64 and opposed horizontally extending guides 65 and 66 between which is guided the belt 10 carrying articles B. For purposes which will hereinafter appear, the upper guide 65 is provided with an opening 67 and the lower guide 66 is provided with a depending tubular portion 68 in alignment with the opening 67.

A vertically movable punch 70 is supported above and in alignment with the opening 67 and is actuated by a suitable mechanism 71 (the details of which are not illustrated). Also reciprocable with the punch 70 throughout a portion of the movement thereof is a spring plunger 72 surrounding the punch 70 and normally extended by a spring 73 so as to enclose the lower end of the punch 70.

Rotatable under the guide assembly 63 and suitably driven by an indexing mechanism (not shown) in timed relation to the belt drive (not shown) is a table 74 adapted to carry into position under the punch 70 an article or workpiece C with which an article B is to be assembled.

In operation, the belt 10 is fed through the guides 65 and 66 and is halted when each of the cavities 11 is successfully brought into registry with the opening 67. The punch 70 is then lowered, carrying the spring plunger 72 downwardly whereupon the latter engages the top surface of the guide assembly 63 and urges it downwardly to cause the tubular extension 68 to enter the workpiece C. During this downward movement of the guide assembly 63 the belt flexes (as illustrated in Fig. 3) to permit this downward movement. Upon continued downward movement of the plunger the guide 66 is bottomed in the workpiece C, thereby halting further downward movement of the guide assembly 63, but the punch 70 continues its downward movement and forces the article B out of the belt and into the workpiece C, the tubular extension 68 serving as a guide for causing the piece B to be properly inserted in workpiece C. Upon return movement of the punch 70 the spring plunger 72 is drawn upwardly away from the guide assembly 63, allowing it to be raised and withdraw the tubular extension 68 from the workpiece C. The mechanism is so timed that after the extension 68 has been withdrawn from the workpiece, the support 74 is indexed to bring the next workpiece (not shown) into position under the punch, whereupon the above described cycle is repeated. Thus it will be seen that the articles can be removed from the belt and assembled with other articles or parts in an automatic and effective manner.

As previously explained, the articles may be inserted in the belt cavities either manually or by means of automatic operating apparatus (not shown) capable of registering the articles successively with the cavities in the belt and forcing them in the cavities respectively.

It will be seen from the foregoing that the belt of the present invention is adapted to be guided in various ways, for example, it is guided in part by the driving sprocket or sprockets such as the sprocket 47 shown in Fig. 2. The belt also may be guided by relatively stationary guides or surfaces disposed along the path of the belt against which one or more faces of the belt are adapted to bear; as will be seen from the foregoing, the guides may be adjustable or they may be movable. Furthermore, the belt may be guided by guiding rolls as, for example, the several guide rolls illustrated in Fig. 2. It will also be seen that the various guiding elements may be positioned to bear against either one or both of the flat sides of the belt or against either or both of the notched or toothed faces of the belt.

The belt of the present invention may take various forms without departing from the spirit of the invention. For example, instead of forming indentations in opposite side faces of the belt to provide driving lugs, the belt may be formed with flat side faces and may be provided with indentations which extend widthwise less than the entire width of the belt and adapted to receive pin-type driving elements such as those on a pin-type driving wheel. Such a form of belt is illustrated in Fig. 4 to which reference now is made.

The modified form of belt illustrated in Fig. 4 is generally rectangular in cross section with each pair of opposite faces lying in parallel planes. The belt member 80 is provided with a longitudinally extending series of cavities 81 preferably equally spaced and preferably similar to the cavities 11 described in connection with the form of belt shown in Fig. 1. The belt member 80 is provided in its two other faces with indentations 82 extending inwardly from each of such faces throughout a portion only of the thickness of the belt, each of which indentations are positioned in the several portions of the belt between each two adjacent article-receiving cavities and are equally spaced. The indentations 82, or depressions, may take any suitable form and by way of illustration, square indentations are illustrated although as may be apparent, they may be round or other shapes depending upon the shape of the pins (not shown) or other driving elements which they are adapted to receive.

This form of belt also may be provided with suitable splicing or connecting means which includes a metal tongue 83 suitably attached to one end of the belt member 80 or by moulding it into the member. At the other end of the belt member a socket 84 is provided of suitable shape as to receive the tongue 83 and to permit that end of the belt member, and the tongue-carrying end of a similarly formed belt member to be brought together in abutting, connected relation. Where the belt is formed from a single member, the ends may be connected by the connecting means just described to provide an endless belt.

The ends of the belt member 80 are provided with notches 85 at each side, each of which takes the form of one-half of one of the indentations 82. Thus, when two members, or the two ends of a single member, are connected as above described, indentations are provided in the opposed faces, which indentations are similar to the other indentations of the member and are spaced from the adjacent indentations a distance equal to the spacing between the other adjacent indentations of the member.

Another modified form of the belt is illustrated in Figs. 5a and 5b. In this form the belt member 90 is generally similar to the belt member 10 except that the cavities 91 take the form of sockets which extend only partially through the width of the belt instead of entirely therethrough as in the first form of the belt described herein. The cavities 91 are adapted to receive only a portion of the articles with the remaining portion of each article being disposed outside the confines of the belt, as will be seen from Fig. 5b, and therefore accessible for inspection, or the performance of work thereon, or for assembly thereon of one or more other parts.

Referring to Fig. 5b of the drawings, the belt member 90 is illustrated in connection with an operation of assembling several parts of an assembly while being carried by the belt, the belt being moved in the direction indicated by the arrow in Fig. 5a. It will be seen that the part D is inserted in a suitable manner in the appropriate cavity 91 as that cavity moves past the work point and a substantial portion of the part remains outside of the cavity to permit assembly of other parts therewith. As the belt moves to the next station, another part E is assembled with the part D and, as the belt is moved to succeeding stations, the parts F and G are assembled successively.

It should be noted that the showing of Fig. 5a is solely diagrammatic for the purpose of illustration, and in a practical application the stations will ordinarily be disposed at greater distances apart along the path of travel of the belt.

In certain instances it may be desired to provide a somewhat greater degree of access to the article than is provided by the belt illustrated in Fig. 5a. This may be accomplished by forming the belt in the manner shown in Fig. 6a, wherein the belt member 100 is provided with lateral projections or extensions 101 in which cavities 102 are formed for receiving articles. It will be seen that in this construction a space is provided between each two adjacent extensions 101 which permits the introduction of the fingers of the operator or mechanisms therebetween, if desired, for the purpose of performing work upon the articles, which space is not present in a belt of the type such as shown in Fig. 5a for example.

Moreover, the belt illustrated in Fig. 6a permits making the cavity deeper than might be possible where the cavity is entirely within the belt itself without, however, requiring that the main body of the belt be made thicker. For example, instead of the cavity 102 terminating at the bottom of the projection 101 it may extend into the main portion of the belt in a manner not illustrated but which will be understood.

In this form of belt the articles are inserted in the cavities with at least a portion of each article H projecting from the cavity, as illustrated in Fig. 6b.

In this form of the belt the projections extend from one side face of the belt opposite the one in which the driving lugs 103 are formed and the sockets therefore open oppositely from the driving face. Accordingly, only one face is provided with driving lugs. In such construction the drive is all along one face of the belt and accordingly, the driving elements such as sprockets must be appropriately positioned. However, since the belt may be twisted or guided appropriately to bring it into proper engagement with driving elements disposed along the path of the belt, there is no particular difficulty in the use of a belt of this construction. It will be necessary, of course, to so position the driving elements that they do not interfere with the projections 101 or the articles carried thereby.

Instead of taking the form of bores or sockets, the cavities may be formed as open-end slits or grooves which extend throughout the width of the belt. This embodiment of the invention is illustrated in Figs. 7a and 7b in which the belt member 110 is provided with a series of cavities 111 which extend throughout the thickness of the belt member and are open at both ends, and in addition, open laterally at the face of the belt opposite the face carrying the driving lugs 112. The cavities 111 may take various forms and may be narrowed or reduced in width at their outer portions as illustrated in Fig. 7a, or they may be of substantially uniform width in a manner not shown. The material on either side of the cavities is formed of sufficient thickness to provide such rigidity so that the side walls of the cavity will grippingly engage the article to be carried and prevent its being unintentionally dislodged.

Because of the construction of the cavities of the type illustrated in Fig. 7a, articles may be readily inserted therein either from above or below, or they may be inserted from the side of the belt, and for this reason are sometimes known as "snap-in" type cavities. It will be seen that this feature permits the use of various types of article-inserting means and greatly broadens the scope and number of applications of the belt. Moreover, because of the nature of the cavities the articles are exposed both above and below the cavities as well as at portions laterally outwardly from the cavity.

The articles may be held in the cavity by engagement with various portions of the article and one manner of supporting articles in the cavity is illustrated in Fig. 7b, in which the articles J are inserted edgewise in the cavities with only a relatively small portion of each article being gripped by the material on the two sides of the cavity.

Where the belt is designed to carry a plurality of identical articles, the cavities generally will be spaced at equal distances longitudinally along the belt. However, instead of arranging the cavities in this manner, they may be disposed in a recurring series of groups or sub-series in each of which groups the spacing between the last cavity in one group and the first cavity of the next succeeding group is not equal to that between the cavities of each group. In such case, however, the spacing between any particular cavity and the corresponding drive face is similar to the spacing between any other corresponding cavity and its corresponding drive face. The foregoing arrangement of cavities is employed, for example, where a single piece is to be supported at two or more points by a corresponding number of cavities. Also, such arrangement may be employed where a group of articles or pieces is to be carried by the belt in predetermined relation, there being a recurring series of such groups of articles.

One form of belt having group type cavities is illustrated in Fig. 8a wherein the belt member 120 is provided with cavities 121 and 122 which have a predetermined spaced relationship and wherein the spacing between adjacent cavities 121 and 122 is different from the spacing between the cavity 122 and the succeeding cavity 121. In other words, the spacing between cavity 122 and the next adjacent cavity 121 in one direction lengthwise of the belt is different from the spacing between the cavity 122 and the cavity 121 next adjacent in the opposite direction along the belt.

The belt member 120 is provided with lugs 123 providing drive faces 124, which preferably are spaced equally along the length of the belt. The cavity 121 is spaced from the drive face 124 a distance which is equal to the spacing between every other cavity 121 and the corresponding drive face 124. However, it will be noted that the drive face 124 following the cavity 122 is not spaced at a distance equal to the aforesaid spacing. It is important to appropriate timing of the movement of the belt that there be a drive face spaced from at least one of the cavities in each group a distance equal to the space between the corresponding drive faces of each other group and the corresponding cavities respectively, whereby the cavities of each group are indexed with equal timing.

For purposes of illustration, the belt 120 is shown with cavities of the "snap-in" type. However, other types of cavities may be arranged in groups in a manner following the principles described in connection with Fig. 8a. For example, the cavities may take the form of bores or sockets arranged in suitably disposed groups; there may be more than two cavities to a group; the cavities may be dissimilar in shape; and the cavities may be disposed in other than an "in-line" arrangement.

As above mentioned, the group arrangement of cavities is often employed where an article is to be carried by the belt wherein the spacing between the two portions of the article which are adapted to be supported by the belt is different from the spacing between portions of such articles. For example, referring to Fig. 8b, the belt member 120 carries articles K having two side portions which are received in successive cavities of the group and wherein the spacing between the side portions is less than the desired spacing between successive articles.

I claim:

1. An article-carrying belt comprising an elongated member formed from an elastomer and flexible in all directions, said member having a longitudinally extending series of spaced, article-receiving sockets extending partially through said member from one face thereof and a longitudinally extending series of equally spaced drive faces lying in planes transversely of the longitudinal direction of said member, each of the sockets being spaced from the nearest drive face a distance equal to the spacing between each of the other corresponding sockets and the drive face nearest thereto respectively.

2. An article-carrying belt comprising an elongated member formed from an elastomer and flexible in all directions, said member having a longitudinally extending series of spaced, article-receiving cavities opening into one face thereof and a longitudinally extending series of equally spaced drive faces formed on the face opposite that into which said cavities open, each lying in a plane transversely of the longitudinal direction of said member, each of the cavities being spaced from the nearest drive face a distance equal to the spacing between each of the other corresponding cavities and the drive face nearest thereto respectively.

3. An article-carrying belt comprising an elongated member formed from an elastomer and flexible in all directions, said member having a longitudinally extending series of spaced, article-receiving cavities opening into three faces of said belt and a longitudinally extending series of equally spaced drive faces lying in planes transversely of the longitudinal direction of said member, each of the cavities being spaced from the nearest drive face a distance equal to the spacing between each of the other corresponding cavities and the drive face nearest thereto respectively.

4. An article-carrying belt comprising an elongated member formed from an elastomer and flexible in all directions, said member having a plurality of similar longitudinally spaced groups of spaced, article-receiving cavities and a longitudinally extending series of equally spaced drive faces lying in planes transversely of the longitudinal direction of said member, one cavity of each group being spaced from the nearest drive face a distance equal to the spacing between each of the corresponding cavities of the other groups and the drive face nearest thereto respectively.

5. An article-carrying belt comprising an elongated member formed from an elastomer and flexible in all directions, said member having a longitudinally extending series of spaced projections extending from a face of said member and each having an article-receiving cavity therein and a longitudinally extending series of equally spaced drive faces lying in planes transversely of the longitudinal direction of said member, each of the cavities being spaced from the nearest drive face a distance equal to the spacing between each of the other corresponding cavities and the drive face nearest thereto respectively.

6. An article-carrying belt comprising an elongated member made of an elastomer and flexible in all directions, and of integral construction in all transverse directions and in at least appreciable increments longitudinally, the member including longitudinally spaced portions each having an article-receiving cavity and a drive face extending generally transversely of the member, said drive face lying in a plane transversely of the longitudinal direction of said member, the mass of the material in each said portion surrounding the cavity forming a backing element for the drive face and being of such magnitude and the material being of such rigidity that regardless of the presence of an article in the cavity, the drive face can be engaged by a drive element and the belt driven thereby without collapsing the material of the said portion.

7. An article-carrying belt comprising an elongated member made of an elastomer and flexible in all directions, and of integral construction in all transverse directions and in at least appreciable increments longitudinally, the member including longitudinally spaced portions each having an article-receiving cavity and a drive face extending generally transversely of the member, said drive face lying in a plane transversely of the longitudinal direction of said member, the mass of the material in each said portion surrounding the cavity forming a backing element for the drive face and being of such magnitude and the material being of such rigidity that regardless of the presence of an article in the cavity, the drive face can be engaged by a drive element and the belt driven thereby without collapsing the material of the said portion, each of the cavities being spaced from the nearest drive face a distance equal to the spacing between each of the other corresponding cavities and the drive face nearest thereto respectively.

8. An article-carrying belt comprising an elongated member made of an elastomer and flexible in all directions, and of integral construction in all transverse directions and in at least appreciable increments longitudinally, the member having longitudinally spaced alternate enlarged portions and indentations extending transversely of the member, each enlarged portion having an article-receiving cavity and a drive face facing to the adjacent indentation, said drive face lying in a plane transversely of the longitudinal direction of said member, the mass of the material in each said portion surrounding the cavity forming a backing element for the drive face and being of such magnitude and the material being of such rigidity that regardless of the presence of an article in the cavity, the drive face can be engaged by a drive element and the belt driven thereby without collapsing the material of the said portion, each of the cavities being spaced from the nearest drive face a distance equal to the spacing between each of the other corresponding cavities and the drive face nearest thereto respectively.

9. An article-carrying belt comprising an elongated member made of an elastomer and flexible in all directions, and of integral construction in all transverse directions and in at least appreciable increments longitudinally, the member having a longitudinally extending series of equally spaced cavities each extending widthways through said member centrally thereof, and web portions of reduced, wall-to-wall thickness alternating with the several portions in which said cavities are formed whereby said latter portions define spaced lugs each having a drive face extending transversely of said belt, said drive face lying in a plane transversely of the longitudinal direction of said member, the mass of the material in each lug surrounding the cavity forming a backing element for the drive face and being of such magnitude and the material being of such rigidity that regardless of the presence of an article in the cavity, the drive face can be engaged by a drive element and the belt driven thereby without collapsing the material of the lug.

10. A package comprising an elongated member made of an elastomer and flexible in all directions, and of integral construction in all transverse directions and in at least appreciable increments longitudinally, said member having longitudinally spaced portions each having an article-receiving cavity and a drive face extending generally transversely of the member, each said portion being in the form of a relatively enlarged lug with the cavity extending widthways therethrough and a substantial mass of material surrounding the cavity, and having a drive face extending generally transversely of the member, said drive face lying in a plane transversely of the longitudinal direction of said member, the mass of the material in each said portion which surrounds the cavity forming a backing element for the drive face and being of such magnitude and the material being of such rigidity that regardless of the presence of an article in the cavity, the drive face can be engaged by a drive element and the said member impelled thereby without collapsing the material of the said portion, and articles in said cavities.

11. A package comprising an elongated member made of an elastomer and flexible in all directions, and of integral construction in all transverse directions and in at least appreciable increments longitudinally, the belt having longitudinally spaced portions each having an article-receiving cavity and a drive face extending generally transversely of the member, each said portion being in the form of a relatively enlarged lug with the cavity extending widthways therethrough and a substantial mass of material surrounding the cavity, and having a drive face extending generally transversely of the member, said drive face lying in a plane transversely of the longitudinal direction of said member, the mass of the material in each said portion which surrounds the cavity forming a backing element for the drive face and being of such magnitude and the material being of such rigidity that regardless of the presence of an article in the cavity, the drive face can be engaged by a drive element and the member impelled thereby without collapsing the material of the lug, and articles in the cavities and contained entirely within the confines thereof.

12. A package comprising an elongated member made of an elastomer and flexible in all directions, and of integral construction in all transverse directions and in at least appreciable increments longitudinally, the member having longitudinally spaced portions each having an article-receiving cavity and a drive face extending generally transversely of the member, said drive face lying in a plane transversely of the longitudinal direction of said member, the mass of the material in each said portion which surrounds the cavity forming a backing element for the drive face and being of such magnitude and the material being of such rigidity that regardless of the presence of an article in the cavity, the drive face can be engaged by a drive element and the member impelled thereby without collapsing the material of the said portion, each of the cavities being spaced from the nearest drive face a distance equal to the spacing between each of the other corresponding cavities and the drive face nearest thereto, and a plurality of similar articles of less length and greater transverse dimension than said cavities disposed in at least certain of said cavities, each with its end spaced inwardly from the side edges of said member.

13. A conveyor belt comprising an elongated member made of an elastomer and flexible in all directions, and of integral construction in all transverse directions and in at least appreciable increments longitudinally, the member including longitudinally spaced portions each having an article-receiving cavity in one side thereof and an indentation in another side thereof forming a drive face lying in a plane transversely of the longitudinal direction of said member, the mass of the material in each said portion surrounding the cavity forming a backing element for the drive face and being of such magnitude and the material being of such rigidity that regardless of the presence of an article in the cavity, the drive face can be engaged by a drive element and the belt driven thereby without collapsing the material of the said portion.

References Cited in the file of this patent

UNITED STATES PATENTS

| | | |
|---|---|---|
| 356,450 | Coleman | Jan. 25, 1887 |
| 1,273,670 | Queron et al. | July 23, 1918 |
| 1,290,842 | Mottin | Jan. 7, 1919 |
| 1,331,043 | Bangerter | Feb. 17, 1920 |
| 1,441,517 | Miskunas | Jan. 9, 1923 |
| 1,920,525 | Roderwald | Aug. 1, 1933 |
| 1,925,502 | Schaeffer | Sept. 5, 1933 |
| 2,280,573 | Flaws | Apr. 21, 1942 |
| 2,306,365 | Stair | Dec. 22, 1942 |
| 2,472,861 | Schaich | June 14, 1949 |